Dec. 13, 1955     C. M. RYERSON     2,727,206
APPARATUS FOR DETECTING A MAGNETIC FIELD
Filed Jan. 14, 1947     5 Sheets-Sheet 1

Inventor
C. M. Ryerson
By M. O. Hayes
Attorney

Dec. 13, 1955   C. M. RYERSON   2,727,206
APPARATUS FOR DETECTING A MAGNETIC FIELD
Filed Jan. 14, 1947   5 Sheets-Sheet 2

Inventor
C. M. Ryerson
M. O. Hayes
By
Attorney

Dec. 13, 1955    C. M. RYERSON    2,727,206
APPARATUS FOR DETECTING A MAGNETIC FIELD
Filed Jan. 14, 1947    5 Sheets-Sheet 3

FIG. 4.

Inventor
C. M. Ryerson

By M. O. Hayes
Attorney

Inventor
*C. M. Ryerson*

By
Attorney

United States Patent Office 2,727,206
Patented Dec. 13, 1955

2,727,206

APPARATUS FOR DETECTING A MAGNETIC FIELD

Clifford M. Ryerson, Washington, D. C.

Application January 14, 1947, Serial No. 722,016

4 Claims. (Cl. 324—43)

(Granted under Title 35, U. S. Code (1952), sec. 266)

This invention relates to a new and improved method and apparatus for detecting and measuring a magnetic field. More specifically, the invention contemplates an arrangement in which a current is derived proportional to the strength of the field to be measured. A second magnetic field is then generated from the derived current and superimposed upon the field to be measured, the second field being substantially equal in magnitude and opposite in sign to the field to be measured, whereby substantially complete neutralization of the first field is obtained, the magnitude of the current giving an indication of the strength of the generated field and hence of the field which it was desired to measure.

One of the objects of the invention is to provide new and improved apparatus for detecting and measuring a magnetic field.

Another object is to provide new and improved field measuring apparatus employing the method of generating a neutralizing electromagnetic field equal in magnitude and opposite in sign to the field to be measured, and registering the current required to set up the generated field, thereby to obtain an indication of the strength of the field.

Still another object is to provide a new and improved magnetometer employing automatic neutralization of the field to be measured.

Still another object is to provide a new and improved circuit for a feedback magnetometer whereby the detector coil is also utilized for generating a neutralizing field.

A further object is to provide an automatic null method of measuring a magnetic field.

A further object is to provide a new and improved amplifier circuit for use in a feedback magnetometer.

Still a further object is to provide a new and improved rectifier arrangement for deriving from an amplified A.-C. voltage a D.-C. neutralizing current proportional to the strength of the field to be measured.

Still a further object is to provide a circuit for obtaining a relatively large D.-C. neutralizing current whereby a neutralizing coil of a few turns may be used.

Other objects and advantages of the invention will be apparent after a study of the specification and drawings, in which:

Fig. 4 is a schematic circuit diagram of a second embodiment of the invention in which a single pick-up or detector coil is used;

Figure 1:
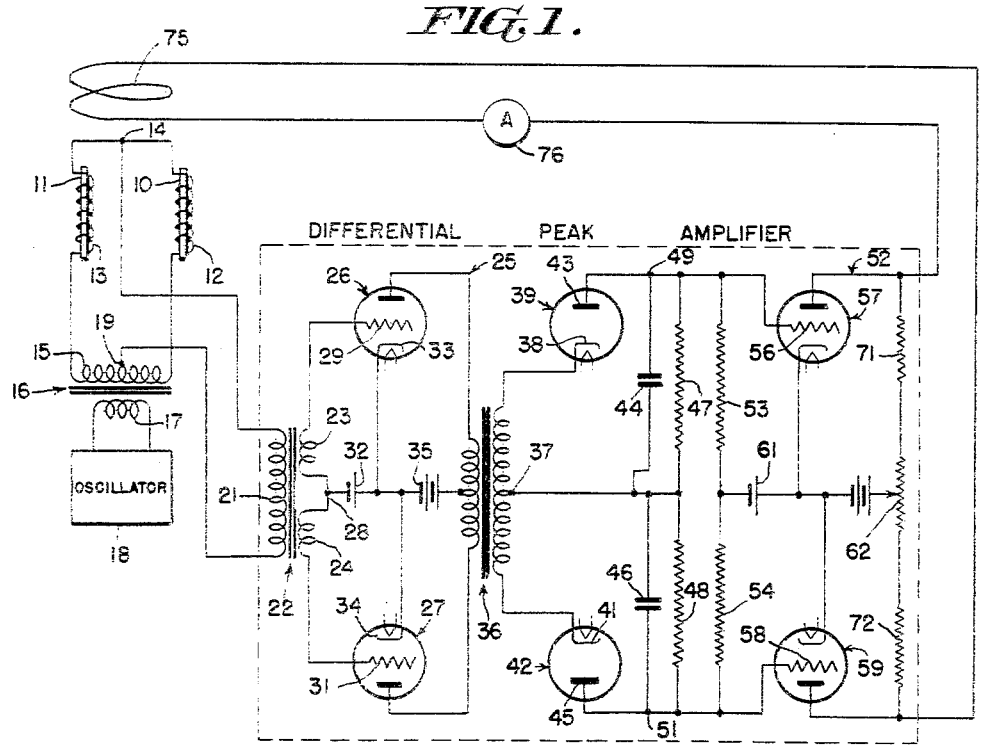
Fig. 1 is a schematic circuit diagram of a preferred embodiment of the device.

Referring now to the drawings, and more particularly to Fig. 1 thereof, the magnetic field responsive means comprises two substantially parallel cores 10 and 11 upon which two similar coils 12 and 13 respectively are arranged to constitute a reactance device. Although the cores may be made of any suitable magnetic material, they are preferably made of material having an extremely high permeability such, for example, as the magnetic alloy sold on the market under the trade name of Permalloy. The coils 12 and 13 are connected so as to have one end of each of the coils joined together at 14, the other ends of the coils being connected to the respective ends of the secondary winding 15 of a transformer 16. The primary winding 17 is connected to an oscillator 18, the oscillator supplying a frequency of the order of eight hundred cycles per second to the primary winding 17. The secondary winding 15 of the transformer has a center tap 19 which is connected to the point 14 through primary winding 21 of the transformer 22.

It will be noted that the elements so far described constitute a bridge circuit with the coil 12 as one arm, the coil 13 as a second arm and the left and right halves of the transformer secondary 15 as the third and fourth arms respectively. The transformer 22 supplies a voltage representative of the state of balance of the bridge to an alternating current amplifier 25 comprising two electronic tubes 26 and 27. The transformer 22 has secondary windings 23 and 24 which are joined together at 28, the other end of the secondary winding 23 being connected to the grid 29 of the tube 26, while the other end of the secondary winding 24 is connected to the grid 31 of the tube 27. A battery 32 biases the two grids 29 and 31 with respect to their cathodes 33 and 34 repectively. The anodes of the tubes 26 and 27 are supplied with a voltage from a source 35, the output from the anodes of the tubes 26 and 27 being fed to the primary winding of a transformer 36. The secondary winding of the transformer 36 is provided with a mid-tap 37, one end of the transformer secondary winding being connected to a rectifying device such, for example, as the cathode 38 of a rectifier tube 39 and the other end of the transformer secondary winding being connected to a similar rectifying device such as the cathode 41 of a rectifier tube 42. The anode 43 of the tube 39 is connected to one plate of a condenser 44 whereas the other plate of the condenser is connected to the mid-tap 37. The anode 45 of the tube 42 is connected to one plate of the condenser 46, the other plate of this condenser being also connected to the mid-tap 37. In parallel with the condensers 44 and 46 are respectively connected a pair of resistors 47 and 48. The rectifier tube 39, the condenser 44 and resistor 47 comprise a peak voltmeter circuit for the positive half cycles of the voltage supplied to the transformer 36, the rectifier tube 42, the condenser 46 and resistor 48 performing a similar function with respect to the negative half cycles of the voltage.

The values of the circuit components in each of these voltmeter circuits are so adjusted that the charging rate of each of the condensers respectively through the associated rectifier is sufficiently rapid so that it will substantially follow the instantaneous value of the alternating voltage impressed across the rectifier and condenser when the voltage has the proper sign. Each condenser discharges through the associated resistor which is of relatively large value and is so proportioned that the discharge rate will be low compared to a cycle of the impressed voltage and thus the voltage across each condenser will be substantially the peak voltage for whichever half of the cycle is passed by the associated rectifier. Since the condensers 44 and 46 are connected with the voltages in opposition, a differential voltage will appear across the points 49 and 51 which will be substantially proportional to the difference in the peak voltages of the positive and negative half cycles. This differential voltage is supplied to an amplifier 52 through a resistance coupling comprising resistances 53 and 54. One end of the resistance 53 is connected to the grid 56 of an amplifying tube 57 and one end of the resistance 54 is similarly connected to the grid 58 of an amplifying tube 59. The opposite ends of both of the resistors are connected together and to a bias source 61. The cathodes of the tubes 57 and 59 are connected to each other and to the bias source 61 in any conventional manner. The anodes of the tubes 57 and 59 are connected to an output circuit including resistances 62, 71, and 72 in parallel with meter 76 and coil 75. The variable resistor 62 may be employed as a balancing means and a zero adjuster for the indicating instrument 76.

The operation of the system so far described is as follows:

The coils 12 and 13, as heretofore stated, are elements of a bridge circuit which comprises these coils and the secondary winding 15 of the transformer 16, the oscillator 18 serving to energize the bridge circuit. The output terminals of the bridge circuit comprise the points 14 and 19. The coils are so connected in the bridge circuit that at any instant the fluxes set up in the cores by the currents flowing respectively through the coils are in opposite directions, and thus, when a substantially steady direct flux passes through the cores 10 and 11 due to the earth's magnetic field or any other field which it is desired to measure, this direct flux is superimposed upon the alternating fluxes in the cores so that during one half cycle it adds to the flux in one of the cores and concurrently therewith opposes the flux in the other core, while during the next succeeding half cycle the flux to be measured opposes the flux in the said one of the cores and adds to the flux in the said other of the cores.

Figure 6:
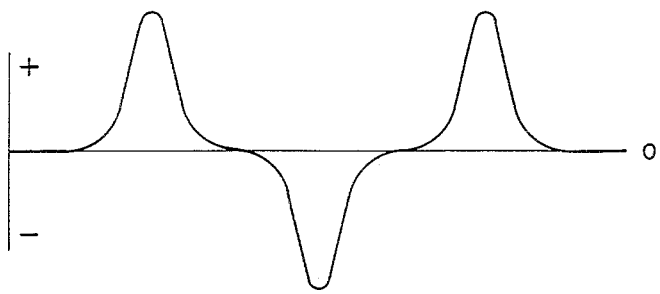
Figs. 6, 7, 8, and 9 are explanatory characteristic curves which serve to illustrate the operation of the system.
Figure 7:
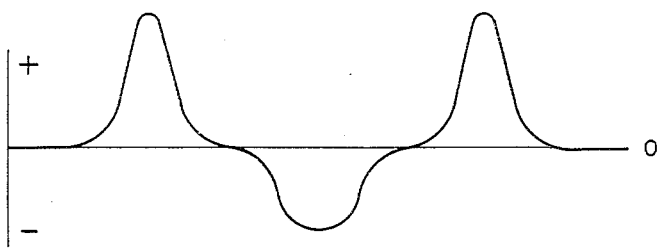

The coils are so wound that the cores are operated through saturation during each half cycle of the voltage wave. Therefore, in the presence of a field to be measured, saturation is reached sooner during one half cycle in each of the cores than during the next succeeding half cycle in the same core. As a result of this the waveform of the output circuit voltage of the bridge is rendered unsymmetrical about its zero axis; that is, one half cycle of the wave, for example, the positive half cycle, is steeply peaked whilst the succeeding half cycle is noticeably flattened as shown in Fig. 7. This figure may be compared with the curve in Fig. 6 which shows the voltage wave when substantially no external flux passes through the cores 10 and 11 and the bridge is substantially balanced. It may here be pointed out that, whether the voltage wave is symmetrical as in Fig. 6 or unsymmetrical as in Fig. 7, the area under the positive half cycle is substantially equal to the area under the negative half cycle of the wave. If the steady direct flux which is to be measured is in the opposite direction to that which produced the curve of Fig. 7, the core which was saturated by the positive half cycle is now saturated later than the other core so that the voltage wave is rendered unsymmetrical about its zero axis in the manner indicated in Fig. 8 and the negative half cycle is sharply peaked, the positive half cycle being flattened. It will be noted by comparing Figs. 7 and 8, that the peaks in these voltage waves are on opposite sides of the zero axis in the respective figures and the areas under the positive and negative half cycles are substantially equal.

Figure 8:
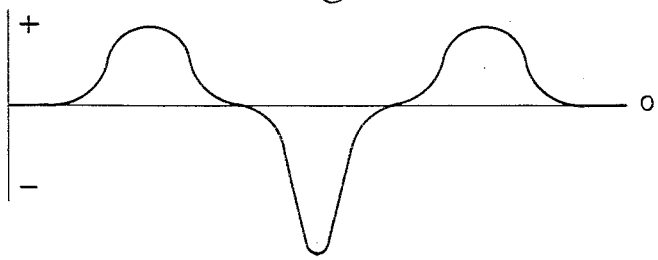

Returning to Fig. 1, it will be seen that a voltage having either the characteristics of Fig. 7 or Fig. 8 appears across the points 14 and 19 of the bridge 20 when a field in one direction or the other respectively is measured. The amplifier 25 is connected so as to amplify this voltage wave although the amplifier may be omitted or it may have as many stages as required. The amplified voltage wave is applied to the network including the rectifier tubes 39 and 42 and the rectifier tube 39 will rectify the positive half cycles of the voltage wave whereas the rectifier tube 42 will rectify the negative half cycles of the voltage wave. As pointed out above, the tube 39 charges the condenser 44 and the constants of this circuit are so adjusted that the charging rate of the condenser will substantially follow the instantaneous peak values of the positive half cycle voltage impressed across the rectifier. This is likewise true of the condenser 46 except that this condenser is charged to the peak values of the negative half cycles of the voltage.

The condenser 44 discharges through its discharge resistor 47 at a rate which tends to maintain the voltage on the condenser 44 substantially at the peak voltages of the respective positive half cycles. The resistor 48 performs the same function with respect to the condenser 46. The condensers 44 and 46 are connected so that the voltage across the points 49 and 51 is equal to the difference in the peak voltages of the positive and negative half cycles of the voltage. This differential voltage is amplified by the amplifier 52 which may have as many stages as desired.

Disposed adjacent the pick-up coils 12 and 13 is the additional coil winding 75 having its axis parallel to the axes of the coils 12 and 13 and substantially symmetrically spaced with respect thereto. The coil 75 is adapted to be energized by direct current from amplifier 52, thereby to generate an electromagnetic field having its main axis in alignment with the steady component of the field to be measured lying along the longitudinal axes of cores 10 and 11. Coil 75 is so connected to amplifier 52 that the polarity of the field generated by coil 75 is such as to oppose or neutralize the field to be measured. If sufficient amplification is available in amplifier 52, the field generated by coil 75 will be sufficient to substantially completely neutralize the field to be measured, in which case the generated field and the field which it was desired to measure will be substantially equal in magnitude, and the strength of the generated field will be an indication of the strength of the original or neutralized field.

To provide an indication of the strength of the generated field, a meter 76 is provided in series with coil 75 to indicate the strength of the current flowing therein. By suitable calibration, as will be obvious to those skilled in the art, the current scale of meter 76 may be calibrated in suitable units of field strength such, for example, as gauss.

The direction of the current flow in coil 75 will be an indication of the direction or polarity of the magnetic field. Hence, if desired, the meter 76 may be of the type in which the zero reading thereof falls in the center of the scale.

Figure 2:
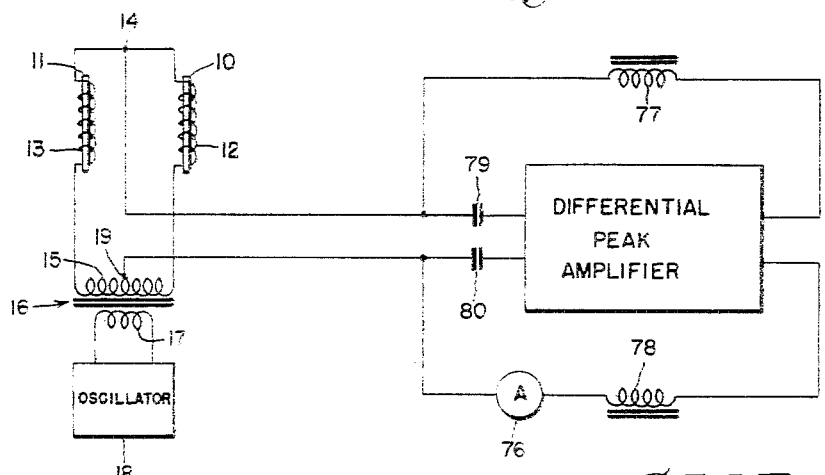
Fig. 2 is a schematic diagram partly in block form of the circuit of Fig. 1 as modified to utilize the detector coils to generate the neutralizing field.

Reference is made now to Fig. 2, in which an arrangement similar to Fig. 1 is shown, but in which the neutralizing current from amplifier 52 flows through the detector or pick-up coils 12 and 13. The output leads from the amplifier are connected to the input leads, the output leads having disposed therein choke coils 77 and 78 for preventing the alternating current from the detector bridge from flowing into the output circuit of the amplifier. The input leads to the amplifier have disposed therein capacitors 79 and 80 for preventing the D.-C. output of the amplifier from getting into the input circuit thereof.

In the operation of the circuit of Fig. 2, connections are made so that the output current from the amplifier flows through coils 13 and 12 in directions to generate fields neutralizing or opposing the field to be measured. As before, the meter 76 indicating the D.-C. current gives an indication of the strength and direction of the generated field, thereby providing an indication of the strength and direction of the field to be measured.

Figure 3:
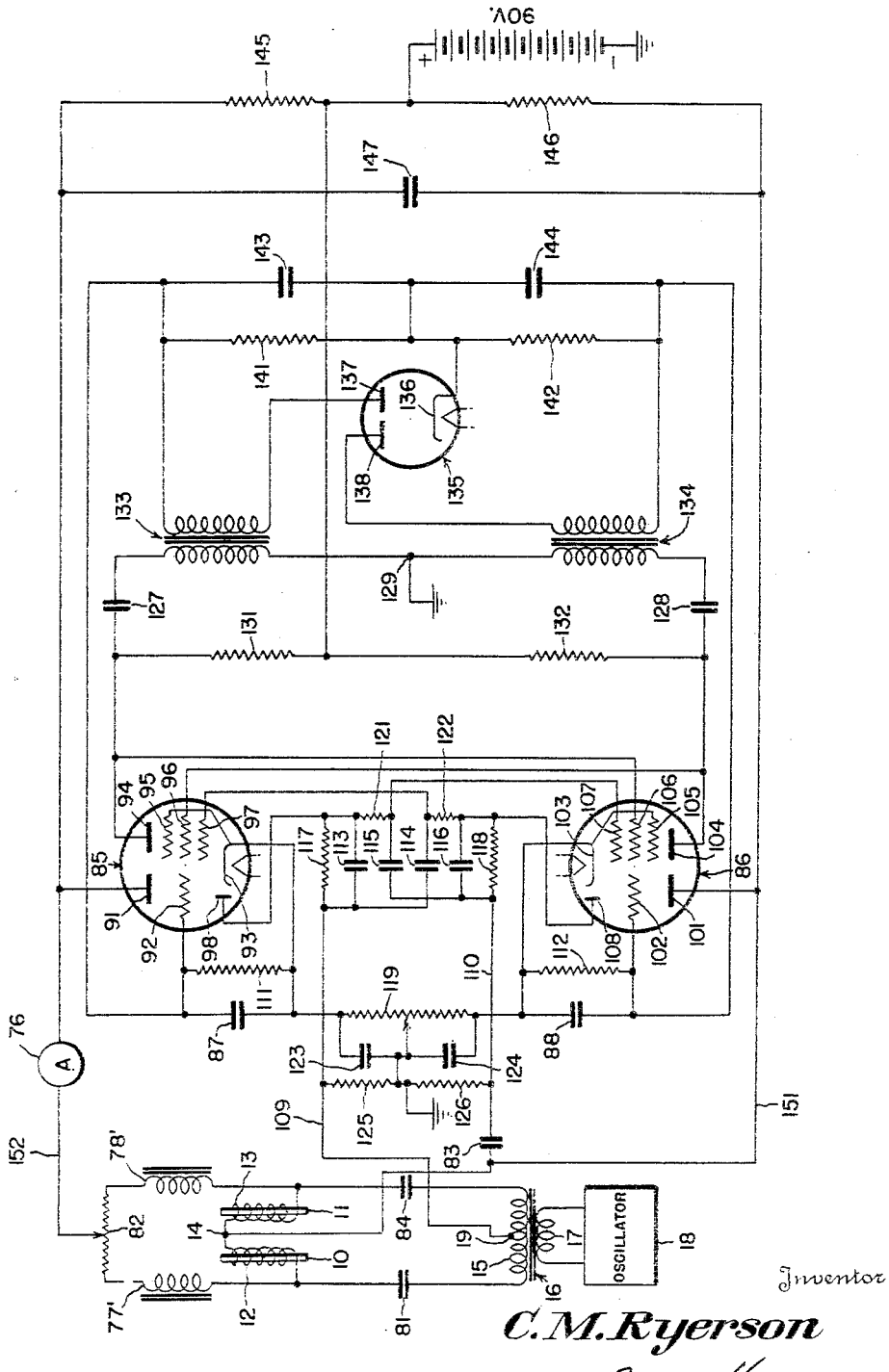
Fig. 3 is a schematic circuit diagram of an improved amplifier and rectifier circuit suitable for use with the bridge arranged detector coils of Fig. 1.

Reference is made now to Fig. 3 which shows a second embodiment of the invention, in which the pick-up bridge is generally similar to that of Fig. 1.

In Fig. 3 however, the leads between the transformer secondary 15 and the pick-up coils 12 and 13 have disposed therein blocking condensers 81 and 84 respectively for preventing the aforementioned D.-C. neutralizing current applied to the detector coils from flowing through the secondary winding, the condensers being of substantially equal capacitance. In parallel with the pick-up coils of the bridge is a neutralizing feed circuit comprising the two chokes or inductors 77' and 78' having disposed therebetween a balancing potentiometer 82, the arm of the potentiometer being connected with the output circuit of an amplifier for supplying neutralizing current to the detector coils, in a manner to be subsequently more fully explained.

Two vacuum tubes 85 and 86 of the amplifier are each triple section tubes having a diode, a triode, and a pentode section, the diode section of tube 85 comprising cathode 93 and plate 98, the triode section comprising cathode 93, grid 92, and anode 91, the pentode section comprising cathode 93, grids 97, 96, and 95, and plate 94. Tube 86 has a diode section comprising cathode 103 and plate 108, a triode section including cathode 103, grid 102, and plate 101, and a pentode section including cathode 103, grids 107, 106, and 105, and plate 104. Whereas multifunction tubes are shown, it is understood that separate tubes could be used if desired to supply the various sections.

The diode sections are so connected as to supply differential bias to the control grids of the pentode sections, whereby the pentode which amplifies one half cycle of the output voltage from the detector bridge has a bias thereon proportional to the amplitude of the other half cycle of the output voltage.

As was previously mentioned, the pick-up or detector bridge, when in the presence of an external field, has, due to the fact that the cores saturate sooner on one half cycle of the exciting voltage than they do on the other, an output voltage of unsymmetrical waveform in which the peak amplitude attained by one half cycle is greater than the amplitude reached by the other half cycle. As beforementioned, Figs. 7 and 8 show the bridge output voltage in the presence of an external field, the half cycle having the greatest amplitude being determined by the direction of the steady field.

The input circuits of the diodes and pentodes are combined, to secure the beforementioned differential bias operation, the circuits being traced as follows: One of the output leads 110 from the bridge has therein a D. C. blocking condenser 83. On the amplifier side of this condenser, a pair of resistances 125 and 126 are connected between from leads 109 and 110 respectively to ground. The two cathodes 93 and 103 have connected therebetween a balancing potentiometer 119 having bypass condensers 123 and 124 connected from the arm to the ends thereof, the arm being connected to ground. The potentiometer, in addition to supplying balancing means, may provide a steady component of bias for the two pentode sections.

Connected in each of the output leads 109 and 110 from the detector bridge is a storage R-C network, comprising in lead 109, the resistance 117 in parallel with condenser 113, and in lead 110, the resistance 118 in parallel with condenser 116, resistance 117 being connected to diode plate 98 and resistance 118 being connected to diode plate 103. Further connections of the input circuits are a connection including resistance 121 between the diode plate 98 of tube 85 and the grid 107 of tube 86, and a connection including resistance 122 between diode plate 108 of tube 86 and grid 97 of tube 85. A coupling condenser 114 connects lead 109 to grid 97 of tube 85, and a coupling condenser 115 connects lead 110 to grid 107 of tube 86.

Assume now by way of description that the detector coils are excited from source 18 and placed in an external field whereby an output voltage similar to that of Fig. 7 is developed across leads 109 and 110, the leads being so connected that the instantaneous positive half cycles of Fig. 7 are applied to lead 110. For the reason that the center tap of resistances 125 and 126 is grounded, and the cathodes 93 and 103 are grounded through potentiometer 119, the upper half cycles of Fig. 7 will tend to make plate 108 positive with respect to cathode 103 whereas the lower half cycles of the wave of Fig. 7 will tend to make diode plate 98 positive with respect to cathode 93. Upon the application of a positive voltage to plate 98, a current flows between it and cathode 93, the current flowing through resistance 117 and developing a voltage thereacross which charges condenser 113.

By proper choice of component values for resistance 117 and condenser 113, an arrangement may be provided in which the charging rate of the condenser is sufficiently rapid so that it will follow the instantaneous value of the peak A.-C. voltage impressed thereacross, in this case, the voltage of the lower half cycles of Fig. 7, the diode and R-C network acting as a peak voltmeter in which the rectified voltage is developed across the series resistance 117.

Similarly, the diode section of tube 86 conducts during the upper half cycles of Fig. 7, developing a voltage across condenser 116 proportional to the peak value of the half cycle. The directions of current flow are such that the right hand plates (Fig. 3) of condensers 113 and 116 are charged negatively.

The voltage developed across condenser 113 by the diode of tube 85 is applied through resistance 121 as a negative bias on grid 107 of tube 86, the grid return circuit to cathode being traced as follows: grid 107 through resistances 121, 117, and 125 to ground and thence through potentiometer 119 to the cathode of tube 86. Similarly, the voltage developed by the diode of tube 86 across the condenser 116 is applied through resistance 122 to grid 97 of tube 85, the grid return circuit being traced as follows: grid 97 through resistances 122, 118, and 126 to ground and thence through potentiometer 119 to the cathode of tube 85.

The control grid 97 of the pentode section of tube 85 thus has a bias applied thereto proportional to the peak amplitude of the upper half cycles of Fig. 7, whereas the control grid 107 of tube 86 has a bias applied thereto proportional to the peak amplitude of the lower half cycles of Fig. 7. However, the control grid 97 of tube 85 is coupled through condenser 114 to lead 109, and has the lower half cycle of Fig. 7 applied thereto as a positive potential, whereas the control grid 107 of tube 86 is coupled through condenser 115 to lead wire 110, whereby the upper half cycle of Fig. 7 is applied to grid 107 as a positive potential. It is apparent then, that differential amplification is obtained in the pentode sections, the section which has the half cycle of greatest magnitude applied thereto in a positive direction also having a bias thereon proportional to the half cycle of lowest magnitude, whereas the pentode section adapted to amplify the half cycle of smallest amplitude has a bias applied thereto proportional to the peak voltage of the half cycle of greatest amplitude. The differential amplification can be enhanced if desired, by the use of a tube having a variable amplification factor, for example, a variable mu pentode.

The plates 94 and 104 of tubes 85 and 86 respectively are connected through blocking condensers 127 and 128 respectively to the primaries of a pair of output transformers 133 and 134 respectively having the other ends of the primary windings grounded at 129. Between the plates 94 and 104 are connected in series resistances 131 and 132, the common point between resistances being connected to a suitable source of plate potential. The outputs of the pentode sections are, accordingly, delivered to the respective output transformers.

It is observed that the plate 104 of tube 86 is connected to the screen grid 96 of tube 85, and that the plate 94 of tube 85 is connected to the screen grid 106 of tube 86. As will be understood by those skilled in the art, these connections provide an arrangement in which the gain of tube 85 is modified by the intensity of the signal amplified by tube 86, an increase in the amplitude of the signal applied to tube 86 resulting in an increase in plate current in that tube, and a fall in the plate voltage thereof and in the screen voltage of the other tube, thereby causing a reduction in the gain of tube 85 and a corresponding reduction in output. Similarly, the gain of tube 86 is modified by the intensity of the signal amplified by tube 85, an increase in the amplitude of the signal applied to tube 5 resulting in a reduction in the gain and output of tube 86. There is provided then, additional differential action supplementing the aforedescribed differential bias.

The double diode tube 135 has the plates 137 and 138 thereof connected to one end of the secondary windings of output transformers 133 and 134 respectively, the other ends of the secondaries being connected through resistances 141 and 142 respectively to cathode 136, resistances 141 and 142 being paralleled by condensers 143 and 144 respectively. Thus, this circuit provides an arrangement whereby, if the circuit constants are chosen properly, a rectified voltage is developed across condenser 143 proportional to the peak voltage output of transformer 133, and a rectified voltage is developed across condenser 144 proportional to the peak voltage output of transformer 134.

The triode sections of tubes 85 and 86 are connected as D.-C. amplifiers, the rectified output from diode plate 137 and transformer 133 being applied to grid 92, the rectified output from diode plate 138 and transformer 134 being applied to grid 102. The grid cathode circuit of grid 92 includes resistance 111 in parallel with condenser 87, and the grid cathode circuit of grid 102 includes resistance 112 in parallel with condenser 88. It is noted that there is a complete electrical circuit for the passage of direct current, this circuit being traced as follows: from resistor 141 through resistance 111, through potentiometer 119, resistance 112, and thence through resistance 142 to the other end of resistance 141. The diode sections of tube 135, in conjunction with the triode sections of tubes 85 and 86, constitute a differential peak amplifier generally similar to that disclosed in Fig. 1 and embracing tubes 39, 42, 57, and 59 therein. The plates 91 and 101 of the respective triode sections are connected as shown to two resistances 145 and 146 having the other ends thereof connected together and to a suitable source of plate energizing potential with the condenser 147 connected between plates. The plates 91 and 101 are also connected by leads 152 and 151 respectively to the arm of potentiometer 82 and to the center point 14 of the detector coils respectively. Lead 152 has the meter 76 therein for indicating the value of the neutralizing current.

The operation of the circuit of Fig. 3 will be readily understood in view of descriptions aforegiven of the operation of the circuits of Figs. 1 and 2. The application of a signal to the aforedescribed input circuit causes a D.-C. current to flow through the leads 151 and 152, and pick-up coils 12 and 13, the direction of flow depending upon which channel including the pentode sections has the signal or half cycle of greatest peak amplitude applied thereto. By suitable choice of circuit connections, the fields generated in the pick-up coils by the D.-C. current therein may be made of proper polarities to oppose the field to be measured. Provided sufficient gain is available in the amplifiers, substantially complete neutralization of the field to be measured may be obtained, the direction and amount of D.-C. current flow as registered on meter 76 giving an indication of the direction and magnitude of the generated field and hence of the field which it was desired to measure.

Reference is made now to Fig. 4, which shows a feedback magnetometer employing a single pick-up or detector coil, and a modified amplifier circuit somewhat similar to that of Fig. 3, and suitable for developing a neutralizing current from the signal generated in the single coil. The oscillator 18 delivers its output to a transformer 161 having primary winding 162 and secondary winding 163. The output of the transformer, which should be of substantially pure waveform for reasons heretofore explained, is delivered through series resistance 164 to the pick-up coil 180 having a saturable core 181.

Figure 9:
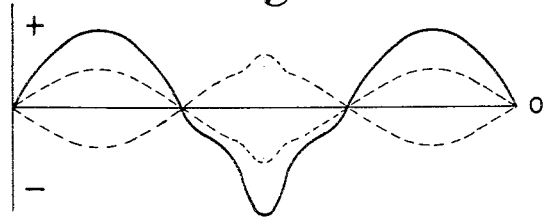

As previously explained, when a saturable core is driven to saturation periodically by an alternating current of substantially sinusoidal waveform, harmonics are introduced in the waveform of the exciting current. If there is a steady component of a magnetic field along the axis of the core, this component will oppose the saturating field during one half cycle and add to the saturating field during the other half cycle. As a result, the core will saturate sooner on one half cycle than on the other, the harmonic distortions of the wave will be different in alternate half cycles, and an asymmetry will be introduced in the waveform in which one half cycle has a peak amplitude greater than the other half cycle. Such a waveform is illustrated in Fig. 9, in which the unbroken trace represents the distortion of the exciting current produced in coil 180 due to the presence in the core of a steady component of a magnetic field. Whether the upper or lower half cycle exceeds the other in amplitude depends upon the direction of the magnetic field along the core. The presence of the resistance 164 in the circuit insures that the impedance of the generator is maintained relatively high with respect to the impedance of the load (coil 180), so that distortions of the waveform occurring in the coil appear in substantial magnitude across the input circuit of the vacuum tube amplifier.

Each of the two vacuum tubes 185 and 186 is a triple section tube, comprising a diode, a triode, and a pentode section. Tube 185 has diode elements including cathode 193 and diode plate 198, a triode section including cathode 193, grid 192, and plate 191, and a pentode section including cathode 193, control grid 197, screen grid 196, suppressor grid 195, and plate 194. Tube 186 has a diode section including cathode 203 and diode plate 208, a triode section including cathode 203, control grid 202, and plate 201, and a pentode section including cathode 203, control grid 207, screen grid 206, suppressor grid 205, and plate 204.

The output leads 165 and 166 from the detector coil 180 have connected thereacross resistances 167 and 168 in series, the common terminal point between resistances being connected to ground. The cathodes 193 and 203 of the tubes 185 and 186 are connected through potentiometer 173 having the arm thereof connected to ground and having condensers 171 and 172 connected between the arm of the potentiometer and the ends thereof respectively. The potentiometer provides means for balancing the gain of two signal channels hereafter to be described, and also provides a steady component of bias for the tubes, as will be hereafter apparent.

The output leads 165 and 166 are connected through condensers 215 and 216 respectively to the control grids 197 and 207 respectively of the pentode sections, grid return to ground from grid 197 being through resistances 221 and 217, and grid return to ground from grid 207 being through resistances 222 and 218. By reason of the voltage divider or center tap connection between resistances 167 and 168, the pentode sections of tubes 185 and 186 each acts as a signal channel for one half cycle of the output voltage of coil 180.

The plates 194 and 204 have series resistances 223 and 224 connected therebetween, the common point between resistances being connected to a suitable source of plate potential, the resistances providing loads individual to the pentode tube plates across which the outputs are developed. Condensers 187 and 188 couple plates 194 and 204 respectively to the grids 192 and 202 respectively of the triode sections, grid returns to cathode being provided by resistances 211 and 212 respectively. The signal outputs of the pentodes are amplified in the triode sections in a conventional manner. The plates 191 and 201 of the triodes are connected through series connected resistors 219 and 220, the common point between resistances being connected to a suitable source of plate potential, outputs of the triode sections being developed across these respective load resistances. Plate 191 is connected to screen grid 196 for reasons to be subsequently explained, and is coupled through condenser 214 to diode plate 208. Similarly, plate 201 is connected to screen 206 and is also coupled through condenser 213 to diode plate 198.

The circuit operates to provide differential bias for the pentode sections, thereby to provide unequal amplification for the two alternate half cycles of the input signal, depending upon which half cycle is of greater amplitude.

Referring again to Fig. 9, in which the unbroken line represents the signal from the detector coil 180, by reason of the center tap arrangement of resistances 167 and 168, at the moment a voltage of given polarity and magnitude resulting from one half cycle of the signal is applied between one pentode control grid and cathode, a voltage of equal magnitude and opposite polarity is applied to the control grid of the other pentode section, these voltages being indicated by the dashed lines of Fig. 9. As aforedescribed, the circuit provides an arrangement in which the signal applied to control grid 207 is amplified in the pentode and triode sections of tube 186 and applied through condenser 213 to the diode plate 198 of tube 185, where rectification occurs, the resulting D.-C. potential being applied through resistance 221 to grid 197. Assume now by way of description that the first half cycle of the signal voltage of Fig. 9 is applied to the voltage divider network including resistances 167 and 168 whereby grid 197 is made positive with respect to cathode at the same moment the image voltage represented by the other dashed line makes grid 207 negative with respect to cathode. The current through the pentode plate 204 decreases, raising the plate potential, causing the potential on the coupled triode grid 202 to increase, increasing the triode plate current, causing the potential on plate 201 to fall. This decrease in voltage is reflected through condenser 213 to anode plate 198, tending to diminish the rectification occurring therein. As aforementioned, by reason of the resistance 221 linking diode plate 198 and grid 197, the rectified voltage developed across resistance 217 by the diode is applied as a negative bias on grid 197. It should be noted also, that the signal voltage applied to grid 197 through condenser 215 is also applied to the diode plate 198 through resistance 221, tending to develop a rectified voltage across resistance 217, but of such limited value in comparison with the amplified voltage applied to the diode through condenser 213 that the effect of the signal voltage in developing a bias may be neglected. By proper choice of component values, it will readily be understood that conditions are provided in which the instantaneous bias on the grid 197 of the pentode is reduced proportional to the amplitude of the half cycle exciting the grid 197 of the pentode in a positive direction, resulting in an instantaneous increase in gain.

The next succeeding half cycle of the signal voltage of Fig. 9 is applied as a potential on the pentode grid 207 positive with respect to cathode or ground. Simultaneously therewith, it causes a negative potential with respect to ground to be applied on grid 197. The circuits of tube 185 operate to reduce the bias on grid 207 of tube 186 proportional to the instantaneous value of the peak voltage of the half cycle. It is apparent then, that differential amplification in the two signal channels is obtained, that channel amplifying the half cycle of greater amplitude having the greater gain. By reason of the intervening stages of amplification provided by the triode sections, the differential bias effect is magnified and enhanced.

The pentode plates 194 and 204 are also observed, Fig. 4, to be coupled through condensers 225 and 226 respectively to the control grids 229 and 230 respectively of a double triode tube 227, grid returns being provided by resistances 233 and 234 respectively, the tube having plates 231 and 232 respectively and cathode 228. After amplification in the double triode, the outputs of the plates 231 and 232 are applied to the primary windings of output transformers 235 and 236 respectively.

Each of the transformer outputs is fed to a full wave rectifier, the rectifier associated with transformer 235 comprising rectifier elements 237, 238, 239, and 240, the elements being of copper oxide type or any other suitable type, the rectifier associated with transformer 236 comprising elements 241, 242, 243, and 244. The output terminals of the full wave rectifiers are connected to the neutralizing solenoid 75 having current indicating means 76 in circuit therewith. It will be apparent to those skilled in the art to which the invention pertains that, upon energization of the amplifier channels from coil 180, a rectified D.-C. current will flow in coil 75, the direction of current flow depending upon which full wave rectifier has the greater output, and hence upon which signal amplifier channel has the greater amplification. As before stated, this latter is determined by that signal channel having the half cycle of greater peak magnitude applied thereto. By proper circuit arrangement, the current flowing in coil 75 is made to set up an electromagnetic field opposing the field to be measured. When the generated field is of sufficient amplitude to substantially null or cancel the field which it is desired to measure, the current indicated by meter 76 will indicate the strength of the field which it is desired to measure.

Figure 5:
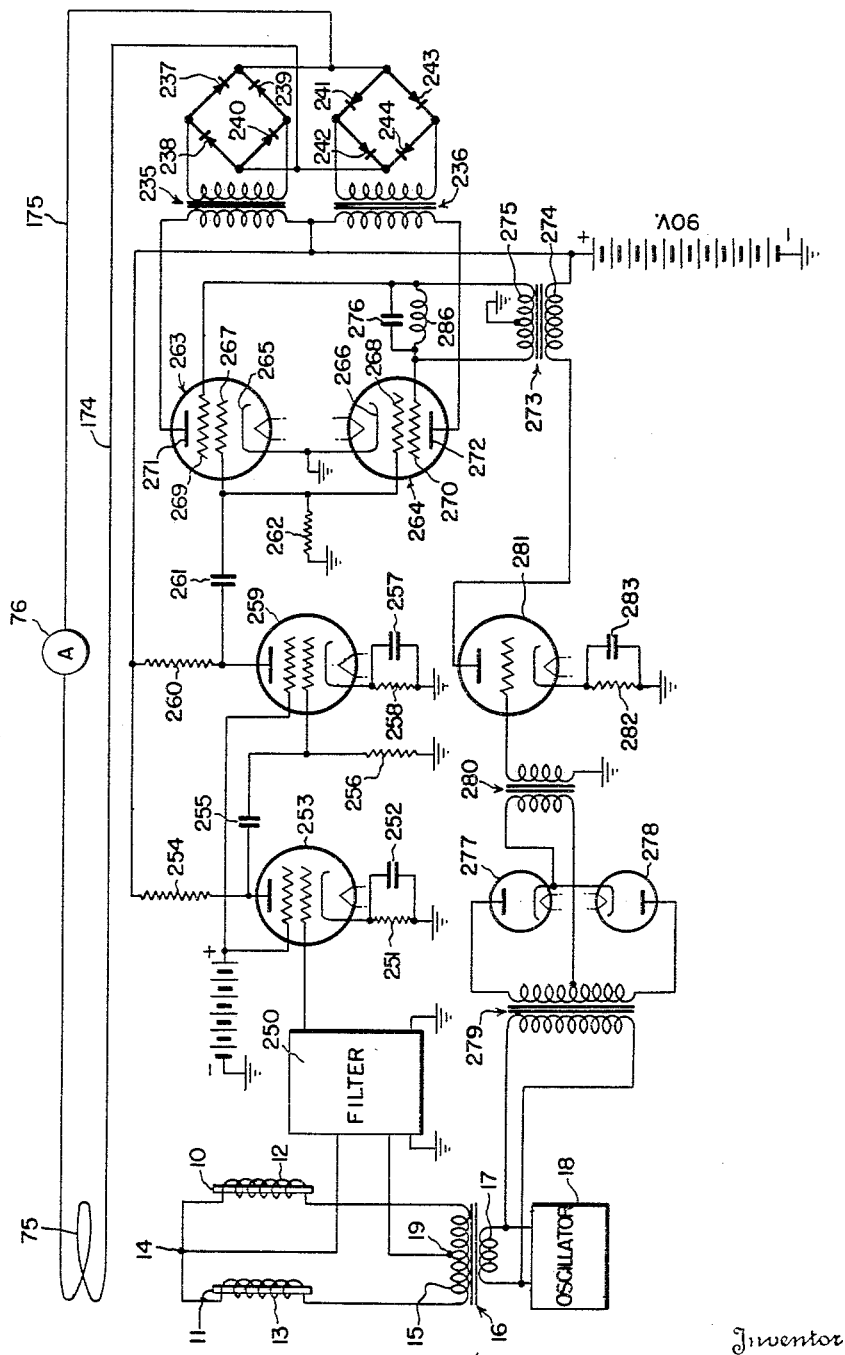
Fig. 5 is a schematic circuit diagram of a third embodiment of the invention using a second harmonic amplifier.

Reference is made now to Fig. 5, which shows a third embodiment of the invention, in which a second harmonic amplifier and phase discriminator are used with a detector bridge to secure a neutralizing current of desired polarity and magnitude. As will be readily understood by those skilled in the art to which the invention pertains, as the current of fundamental frequency from source 18 is passed through coil windings 12 and 13 sufficient to drive the magnetization in cores 10 and 11 near saturation, the even order harmonic voltages which appear across windings 12 and 13 are proportional in magnitude to the constant component of the magnetic field which is acting in the direction of the principal axis of the magnetic core. As is well known, the production of harmonics is due to the curvature of the magnetization curve as the saturation point is approached. The harmonic output voltage is approximately proportional in magnitude to the intensity of the magnetic field along the aforementioned core axis and the phase of the even harmonics is proportional to the direction of magnetization provided the field is within the linear portion of the magnetization curve of the core.

In the circuit of Fig. 5, the output of the detector bridge comprising coils 12 and 13 is fed to a filter which passes substantially only the second harmonic and discriminates against other frequencies. The output of the filter excites an amplifier.

Whereas any desired amount of amplification may be employed, in the circuit shown two stages are employed, the first comprising tube 253 having biasing network 251—252, plate load resistor 254, and coupling condenser 255; the second comprising tube 259 having grid return resistance 256, biasing network 257—258, plate load resistance 260, and coupling condenser 261.

The oscillator 18 has lead connections going therefrom to a second transformer 279 which excites a frequency doubler including diodes 277 and 278 and the primary of transformer 280, the output of transformer 280 being amplified as desired, in the circuit shown by one stage comprising tube 281 having biasing network 282—283, and thence delivered to the primary 274 of a transformer 273.

The aforementioned phase discriminator includes two screen grid tubes 263 and 264, having cathodes 265 and 266 respectively, control grids 267 and 268 respectively, screen grids 269 and 270 respectively, and plates 271 and 272 respectively. The plates have individually in circuit therewith the primaries of the two output transformers 235 and 236. The amplified second harmonic signal from the detector bridge is applied in simultaneous phase to the two grids 267 and 268, having common grid return resistance 262 to ground. The voltage of twice the fundamental frequency derived from the oscillator and frequency doubler is fed in phase opposition through the center tapped secondary 275 of transformer 273 to the two screen grids 269 and 270, having capacitor 276 and inductance 286 thereacross to provide a wave filter.

The tube which has the signal voltage and the screen grid voltage applied in phase or in similar instantaneous polarities with respect to cathode will pass more current than the other tube, which will have the signal voltage and phasing voltage from transformer 273 applied in phase opposition. Accordingly the output of one of the transformers 235 or 236 will exceed that of the other, and the rectified current from one of the full wave rectifiers will, as before explained, exceed that of the other, causing a current to flow through meter 76 and coil 75. By proper choice of circuit connections, the field generated in coil 75 is made to oppose the field to be measured, thereby to neutralize or cancel the same. It is contemplated that sufficient amplification will be provided whereby the generated field will substantially completely neutralize the field to be measured, the current through meter 76 indicating the strength of the field, the direction of the flow of current giving an indication of the polarity of the field to be measured.

Whereas the circuit arrangement of Fig. 5 has been shown as utilized with a bridge or two coil detector the circuit is also well adapted for use with a single detector coil.

Any suitable means may be provided for heating the filaments or heaters of the various tubes. Whereas triodes, pentodes, or diodes are shown, it is understood that tubes employing other arrangements of elements may be employed, the functions of the various sections remaining the same. When common plate supplies are used for the various tubes, decoupling means may be employed if desired, or separate supplies used.

It is understood that additional amplifiers may be added if desired.

Whereas the invention has been shown and described with reference to specific embodiments thereof which give satisfactory results, it is obvious that various modifications of form or structure may be made without departing from the spirit or scope of the invention, and I therefore include all such modifications and equivalents in the appended claims.

The invention described and claimed herein may be manufactured and used by or for the Government of the United States of America without the payment of any royalties thereon or therefor.

What is claimed as new and desired to be secured by Letters Patent of the United States is:

1. In a feedback magnetometer of the character disclosed for detecting a magnetic field, a signal detector, a source of energization for said detector, said signal detector being adapted to generate a frequency component of voltage having the magnitude and phase characteristics thereof determined respectively by the magnitude and direction of the component of the magnetic field lying along the principal axis of said detector, a filter for selecting said component of voltage, means for amplifying said component of voltage, a circuit energized from said amplifying means, rectifier means for rectifying the output of said energized circuit, a coil disposed in predetermined position with respect to said detector and adapted when energized to generate a magnetic field having the largest component thereof in alignment with said component of the field, means for causing a current to flow to said coil from said rectifier means, means for deriving a second voltage from said source having a frequency substantially identical with the frequency of said component of voltage, and dual electron discharge means in said energized circuit and preceding said rectifier means, said dual electron discharge means being responsive respectively to opposing phase components of said second voltage for controlling the direction of said current flow to said coil selectively in accordance with the polarity of the field to be measured, thereby to generate a field of opposing polarity with respect thereto.

2. In a feedback magnetometer for detecting a magnetic field, a signal detector, a source of voltage of fundamental frequency and substantially sinusoidal waveform for energizing said detector, said detector being adapted to introduce harmonic distortions into the waveform of said voltage proportional to the polarity and magnitude of the component of the magnetic field lying along a given axis of said detector, filter means operatively connected to said detector and adapted to pass substantially only a voltage having the second harmonic frequency of said fundamental frequency, dual output amplifier means excited from said filter means, rectifying means for simultaneously rectifying separately the dual outputs of said amplifier means and opposingly combining the rectified outputs to derive a unidirectional current correlative to the polarity and magnitude of the magnetic field, a coil disposed in predetermined position with respect to said detector and adapted when energized with said unidirectional current to generate a field having the greatest component thereof in alignment with said axis of the detector coil, circuit means energizing said coil with said unidirectional current, and means controlled by said source of voltage of fundamental frequency and operatively connected to apply opposing phase components of the second harmonic of said fundamental frequency to said amplifier means for predetermining the direction of current flow in said coil selectively in accordance with the polarity of the field to be measured thereby to insure the generation of a field in said coil opposing the field to be measured.

3. In a feedback magnetometer of the character disclosed, means for generating a signal of predetermined frequency representative of the magnitude of a magnetic field, amplifier means responsive to said signal and including a pair of thermionic tubes, each of said tubes having two grids therein adapted to control the conductivity of the tube, means for applying said signal simultaneously in identical phase relation to one grid of each of said tubes, means for applying a voltage of the same frequency in instantaneous phase opposition on the other grid of each of said tubes whereby said signal is passed by the tube to which the signal and voltage are applied in phase, dual rectifier means individually energized from said amplifier tubes, and means energized from said dual rectifier means for generating a second field substantially equal in magnitude to said first field and of opposite polarity.

4. In a feedback magnetometer of the character disclosed, a signal detector, a source of voltage of fundamental frequency and substantially sinusoidal waveform for energizing said detector, said detector being adapted to introduce harmonic distortions into the waveform of said voltage in accordance with the polarity and magnitude of the component of the magnetic field lying along a given axis of said detector, filter means operatively connected to said detector and adapted to pass substantially only a voltage having the second harmonic frequency of said fundamental frequency, amplifier means excited from said filter and including a pair of thermionic tubes, each of said tubes having two grids therein adapted to control the conductivity of the tube, means for applying the voltage derived from said filter simultaneously in identical phase relation to one grid of each of said tubes, a frequency doubler comprising a pair of rectifier tubes and energized from said source, means for applying the voltage derived from said frequency doubler in instantaneous phase opposition on the other grid of each of said tubes whereby said tubes are selectively rendered more conductive when the voltages on the two grids thereof are in phase, dual rectifier means individually energized from said amplifier tubes, and means energized from said dual rectifier means for generating a second field substantially equal in magnitude to said first field at said detector and of opposite polarity.

References Cited in the file of this patent

UNITED STATES PATENTS

| | | |
|---|---|---|
| 1,863,415 | Rieber | June 14, 1932 |
| 2,151,627 | Vacquier | Mar. 21, 1939 |
| 2,406,870 | Vacquier | Sept. 3, 1946 |
| 2,410,039 | Beach | Oct. 29, 1946 |
| 2,418,553 | Irwin | Apr. 8, 1947 |
| 2,420,580 | Antes | May 13, 1947 |
| 2,421,583 | Stuart | June 3, 1947 |
| 2,440,503 | Fay | Apr. 27, 1948 |
| 2,447,849 | Fay | Aug. 24, 1948 |
| 2,476,273 | Beach | July 19, 1949 |
| 2,480,575 | Hare | Aug. 30, 1949 |